Patented Sept. 27, 1927.

1,643,692

UNITED STATES PATENT OFFICE.

FRANÇOIS BILLON, OF PARIS, FRANCE, ASSIGNOR TO LES ETABLISSEMENTS POULENC FRÈRES, OF PARIS, FRANCE.

SALTS COMPOSED OF ALKALOIDS AND ACETYLAMINO-HYDROXYPHENYL ARSENIC ACID AND METHOD OF PREPARING THE SAME.

No Drawing. Application filed March 19, 1926, Serial No. 96,056, and in France March 28, 1925.

The present invention relates to salts composed of alkaloids and acetylaminohydroxyphenylarsenic acid and methods of preparing the same. It relates more particularly to the preparation of compounds of the alkaloids found in cinchona bark with the above named acid. Salts of this class are only feebly soluble in cold water and are also only feebly toxic. They possess, further, the therapeutic properties both of the arsenical compound and of the active alkaloids.

According to the present invention, either one of two methods may be used for preparing the above-mentioned salts. Either the alkaloid itself (pure or consisting of a mixture of bases) may be made to react directly with the acid, or a salt of the alkaloid may be made to combine by double decomposition with a salt of the acid.

As an example of the first of these two methods a detailed description of the preparation of the salt of quinidine will be given.

Salt of quinidine: Dissolve in water heated by a water-bath 325 parts of quinidine and 380 parts of acetylamino-hydroxyphenylarsenic acid. When solution is complete, filter and permit to stand for 24 hours, scratching the walls of the beaker from time to time. The salt crystallizes slowly and separates in the form of a felted mass.

The following is an example of the second of the two methods mentioned above.

Preparation of the salts of quinine. Dissolve in water at the temperature of a water-bath equal parts of quinine-hydrochloride and sodium acetylamino-hydroxyphenyl arsenate; filter; cool the solution with occasional stirring. Fine crystals will begin to appear and eventually the whole solution will crystallize. The crystals are dried for 24 hours, washed with cold water and recrystallized from hot water.

The reaction taking place is:—

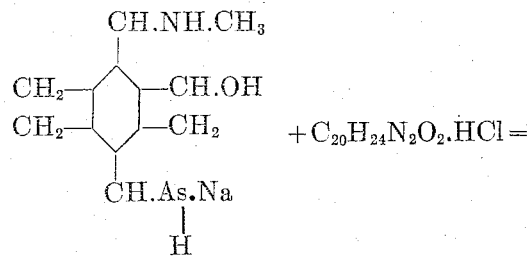 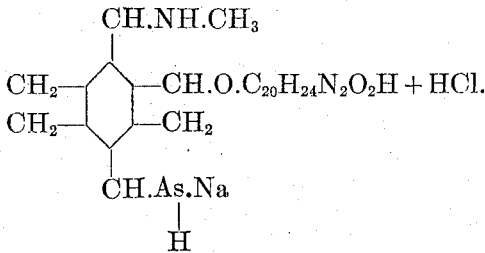

The salt crystallizes in fine needles, is extremely soluble in methyl alcohol, easily soluble in ethyl alcohol, soluble in hot water, insoluble in acetone, ether, benzene and ethyl acetate.

Having now particularly described and ascertained the nature of my said invention and in what manner the same is to be performed, I declare that what I claim is:—

1. A composition of matter comprising a salt composed of quinine, chemically combined with acetylaminohydroxyphenylarsenic acid.

2. A composition of matter comprising a salt formed of a cinchona bark alkaloid and acetylaminohydroxyphenylarsenic acid.

3. A process of preparing alkaloid compound of acetylaminohydroxyphenylarsenic acid, which comprises intermixing under reacting conditions the acid and a reactant form of the alkaloid, the reaction being effected by dissolving in warm water the substances entering into the reaction, intermixing the solutions thus formed, and recovering the resulting product.

4. A method of preparing alkaloid salts of acetylaminohydroxyphenylarsenic acid which comprises dissolving an acid salt of a cinchona bark alkaloid and a salt of the above-named acid in warm water, cooling and separating the crystals.

5. The method of preparing alkaloid salts of acetylaminohydroxyphenylarsenic acid which comprises dissolving an acid salt of a cinchona bark alkaloid and an alkali salt of the above-named acid in warm water, cooling and separating the crystals.

6. A process as claimed in claim 3 in which the alkaloidal compound is a cinchona derivative.

7. A composition of matter comprising an alkaloid salt of acetylaminohydroxyphenyl-arsenic acid which retains the therapeutic properties both of the active alkaloids and of the arsenical compound.

In testimony whereof I affix my signature.

FRANÇOIS BILLON.